A. JENSEN.
MILK TESTING BOTTLE.
APPLICATION FILED OCT. 16, 1909.

956,708.

Patented May 3, 1910.

WITNESSES:
F. C. Fliedner
N. B. Keating

INVENTOR
A. Jensen
BY
F. W. Wright
ATTORNEY

UNITED STATES PATENT OFFICE.

AAGE JENSEN, OF EUREKA, CALIFORNIA.

MILK-TESTING BOTTLE.

956,708. Specification of Letters Patent. Patented May 3, 1910.

Application filed October 16, 1909. Serial No. 522,951.

*To all whom it may concern:*

Be it known that I, AAGE JENSEN, a citizen of the United States, residing at Eureka, in the county of Humboldt and State of California, have invented new and useful Improvements in Milk-Testing Bottles, of which the following is a specification.

The present invention relates to an improved testing bottle for the determination of the proportion of fat in liquids, and especially in milk and its products.

The object of the invention is to provide a bottle by which the operation of testing for fat can be very materially shortened in time, and also to provide one in which great accuracy is attained notwithstanding the rapidity with which the operation of testing may be conducted.

Figure 1:
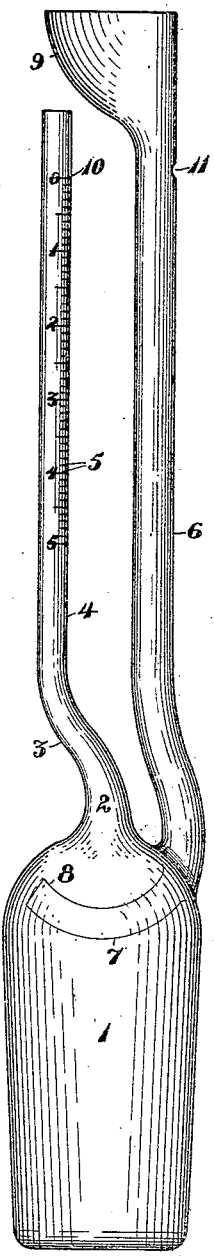
Figure 2:
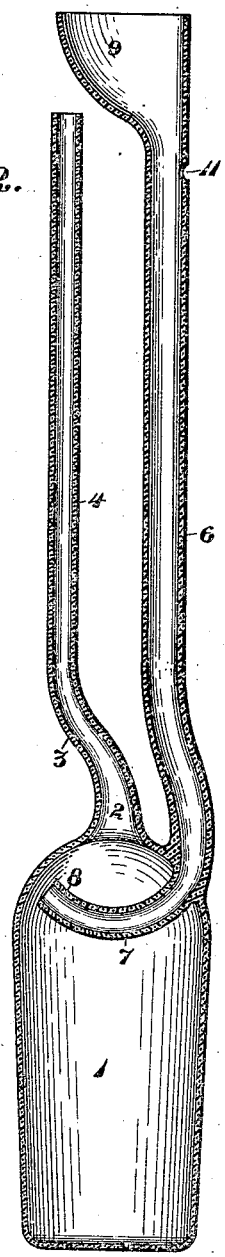

In the accompanying drawing, Figure 1 is a side elevation of my improved bottle; Fig. 2 is a longitudinal section thereof.

Referring to the drawing, 1 indicates a glass bulb or body of a bottle, made heavy at the bottom to withstand a given pressure produced by centrifugal force. The top of said bulb is extended and contracted in diameter to form a tube 2, which is bent to one side of the vertical axis of the bulb, as shown at 3, and is then extended parallel with said axis, but offset therefrom, as shown at 4, said offset tube 4 being graduated, as shown at 5, to permit a numerical determination to be made of the amount of fat in a sample tested. Said tube 4 being offset in the manner above described permits of another tube 6 to extend vertically from the bulb, parallel with the tube 4, and on the other side of the vertical central axis of the bulb, the lower end of said tube 6 having an extension 7 into the upper end of the bulb, said extension being curved, first, slightly downward, then horizontally across the center of the bulb, and then slightly upward, as shown at 8. The upper end of the tube 6 is formed to a funnel 9 so shaped and arranged as to be concentric with the central vertical line through the bulb 1. On the outer side of the tube 6, but exactly on the same level with the zero graduation 10 of the tube 4 is a small overflow hole 11, which prevents any liquid rising in the tube 4 above said zero mark.

The testing operation is as follows, assuming that standard milk is being tested:—A given quantity of milk is measured into a pipette, and is allowed to flow down the tube 6 and into the bulb. Next, a quantity of sulfuric acid is measured into the same tube, the bottle being held in an inclined position so as to allow the acid to flow to the bottom passing under the milk. The acid being of much greater specific gravity, the above method of pouring the acid insures that all particles in the tube 6 are washed into the bulb 1. Next, by a rotary movement, the acid and milk are mixed, causing a chemical combination of the two, with the exception of the fat in the milk, which fat is insoluble in the acid. The bottle is now placed in a centrifugal testing machine, and is revolved in said testing machine for a given time, and then warm distilled water is allowed to enter in the funnel 9 in quantity sufficient to raise the level of the mixture to the tube 4. The bottle is then again revolved in the centrifugal testing machine for a short time, when warm distilled water is again allowed to enter, completely filling the bottle and forcing all the separated fats into the graduated part of the tube 4, the upper end of the column of fats being on a level with the overflow hole 11, and therefore at the zero graduation mark, thereby preventing any error in the determination of the proportion of fat which would otherwise arise from said column rising above the zero mark, of fat, or even though a surplus amount of water be used, since the water then flows automatically through the hole 11.

The centrifugal machine is now stopped and the bottle is lifted out and the graduation read.

One of the important features of the invention is the overflow hole 11, the function of which has already been explained.

Another feature resides in the form of the tube 7. By reason of the fact that the outer end of said tube curves upwardly or backward, any liquid of low specific gravity is prevented overflowing back through said tube 7.

A further important improvement resides in the form and arrangement of the funnel 9. By reason of its central position, it can receive the distilled water while revolving in the centrifugal machine.

I claim:—

1. A testing bottle comprising a bulb or main body portion, a graduated tube leading from the top thereof, and a filling tube connected with said tube, substantially parallel with the graduated tube, said filling tube having an overflow hole on the same plane, transverse to said filling and graduated tubes, as the zero mark on said graduated tube, substantially as described.

2. A testing bottle comprising a bulb or main body portion, a graduated tube extending upward from the top thereof, a filling tube connected with said top, and having a tubular extension therefrom, into said body portion, bent at its outer end toward said top, substantially as described.

3. A testing bottle comprising a bulb or main body portion, a graduated tube extending upward from the top thereof, and a tube leading to said top and formed at the top into a funnel through which the central axial line of the bottle extends, substantially as described.

4. A testing bottle comprising a bulb or body portion, a filling tube for supplying liquid to said body portion and having its upper or supply end located on the axial line of said bulb or body portion, and having therein an overflow outlet, a graduated tube connected to said body portion, and having the zero graduation on the same plane, transverse to said axial line, as said outlet, said filling tube extending downward into said body portion and bent in an upward direction therein, substantially as described.

In testimony whereof I have hereunto set my hand in the presence of two subscribing witnesses.

AAGE JENSEN.

Witnesses:
J. M. NISSON,
C. M. GEORGESON.